July 23, 1940. J. REEH 2,209,137
REFRIGERATING PLANT
Filed March 23, 1938 2 Sheets-Sheet 2

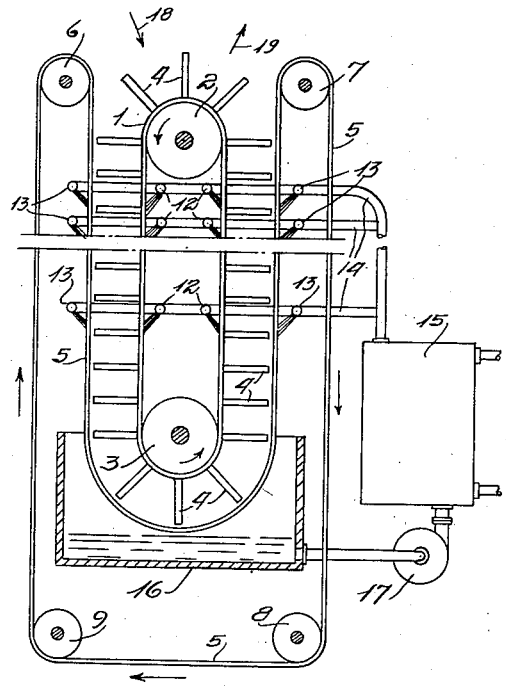
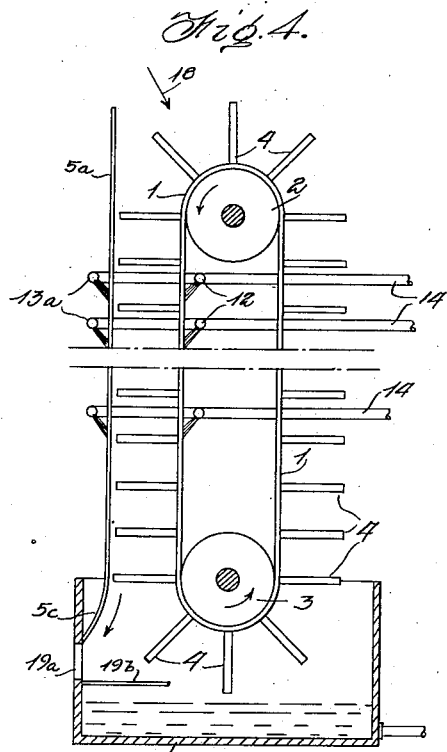
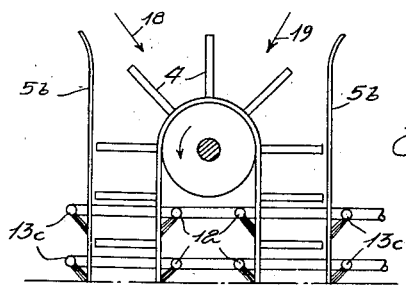
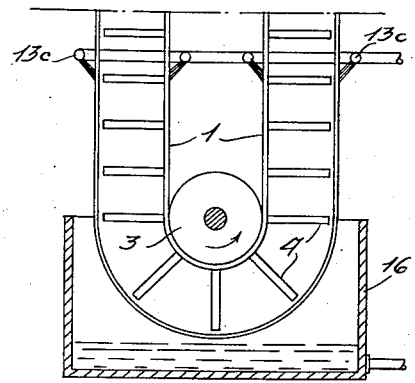

Inventor:
Johannes Reeh

Patented July 23, 1940

2,209,137

UNITED STATES PATENT OFFICE 2,209,137

REFRIGERATING PLANT

Johannes Reeh, Chatenay-Malabry, France

Application March 23, 1938, Serial No. 197,705
In Germany March 19, 1937

8 Claims. (Cl. 62—104)

The invention relates to a method and apparatus for indirectly freezing victuals by sprinkling endless bands with refrigerating brine.

Many victuals, especially vegetables, fruits, cut meat, small fish, eels and the like should not come into direct contact with refrigerating brines, so as to avoid absorption of salt. Therefore such victuals have been cooled to low temperatures in various ways by placing them in open or closed containers and passing them over or through the brine. Particularly two endless superposed bands have been employed which run in horizontal planes and in opposite directions at a distance apart, both the upper and lower band being sprayed with brine. In this instance the victuals are introduced at one end and removed in frozen state at the other end. This horizontal position of the bands requires too much space as they are mostly not less than 15 metres in length and consequently it was difficult to moisten uniformly with brine particularly the lower band by spraying and to avoid great losses of cold on account of this horizontal position.

Contrary to the known methods the method according to the invention provides two endless bands guided in vertical or substantially vertical direction, the victuals being placed and held between these bands and the cooling brine being supplied at least in the upper part to the surfaces of the bands remote from the victuals so that it trickles down at these ends of the bands. According to this method the apparatus consists substantially in that two endless bands, at least one of which is equipped with holding devices, are guided by reversal vertically and parallel to each other and that on the surfaces of the vertically guided portion or portions sprinkler pipes are arranged which are connected with a refrigerating machine, and have spraying apertures directed towards the surfaces of the bands remote from the victuals.

The invention enables the cooling effect of the brine to be advantageously utilized as the brine trickles down the bands, and the apparatus can be accommodated on a very small floor surface. In vertical direction the apparatus can extend through several stories of a cool-house or the like. The holding devices preventing the victuals from slipping between the bands may be of any desired construction, and may consist, for example of plates, grids or the like fixed on the bands perpendicularly to one of the surfaces thereof and preferably extending up to one of the surfaces of the other band. This second band may also surround the first which is guided over one or several reversing means at its upper and lower ends, the holding devices on the first band serving at the same time as spacer elements for the second band so that for the latter reversing means need only be provided at the upper end. In this instance where the second band surrounds the first inner band, this inner band need only be exposed at its upper apex, to enable the victuals to be placed between the holding devices on the inner band and to be also removed therefrom. A particular advantage is, that by the upper reversal the holding devices are spread asunder so that the victuals can easily be accommodated and on leaving the reversal are tightly clamped between the devices with the result that the contacting surface with the victuals is enlarged. It is advisable to make the holding devices of a good cold conducting material. The second surrounding band may have projections and the like by which the victuals are tightly clamped in a direction perpendicular to the bands, so that they bear snugly against the cooled bands themselves.

According to the invention two bands, one of which has holding devices, may convey the victuals only in downward direction, that is the victuals are introduced between the bands at the top and removed at the bottom. However, in this instance the refrigerating apparatus must be made larger as when the victuals are circulated, if the same efficiency is to be obtained. In this instance only one endless band having holding devices is employed, whereas a stationary sprayed wall is used instead of the second band. This substitution of one band can also be effected for the circulating band according to the above explanations, according to what victuals are to be treated.

The cooling brine is sprayed on to the side of the bands remote from the victuals by means of nozzles or the like, whereby the degree of cold is utilized advantageously as the brine can trickle down by gravity on account of the vertical position of the bands. The brine can be caught in a vessel at the bottom, returned to an evaporator by a pump aggregate and again used for spraying. It is proposed, according to the invention, to spray the brine at different degrees of cold against the endless bands. This cooling in stages is best carried out so that, for example, brines of lower temperature are employed in the descending portion of the refrigerating apparatus than in the ascending portion, the temperatures being between —10° C. at the beginning and —30° C. at the end, so that in the case of certain lengths and circulating periods of the bands a complete refrigeration or a cooling of the victuals can be attained.

The time during which the bands circulate can be selected according to the thickness and kind of victuals.

In order to attain a particularly good cold exchange between the brine on the bands and the victuals to be cooled, it is proposed, according to another feature of the invention, to construct the inner band in undulated or in similar shape. The band is then made of elastic, rust-proof material, for example stainless band steel, a good contacting with the reversing pulleys being also attained by connecting the inner undulation peaks by chains, links, straps or the like at the side of the bands to prevent stretching. The undulation peaks then serve as holding devices for the victuals to be cooled which are therefore surrounded on four sides by walls sprayed with brine, so that in this manner the most possible utilization is attained with uniform freezing through and through. The sides of the bands to be sprayed with brine may be covered with wire netting or the like in order to avoid too rapid trickling down of the brine. Owing to the possibility of cooling on all sides the bands may be very short and the circulating time reduced. If one band is of corrugated construction the second band may also have corrugations but of lesser height or section, whereby these small corrugations resiliently press the victuals into the indentations in the first band so that contact between the victuals and the second or surrounding band is ensured in any case. It is evident that the surrounding band may then also be corrugated or provided with profiles or projections or the like, if the inner band has some other kind of holding devices.

The circulation of the bands may be continuous or intermittent, in the latter instance the stoppage time serves for placing the victuals between the holding devices by hand or by separate pushing devices.

Three embodiments of the invention are illustrated, in the accompanying drawings, in which—

Fig. 1 is a diagrammatic view showing an apparatus in vertical section,

Fig. 4 is a diagrammatic view showing a modification wherein a single moving belt is employed.

Fig. 5 is a view similar to Fig. 4 but showing a modification thereof.

Figure 2:
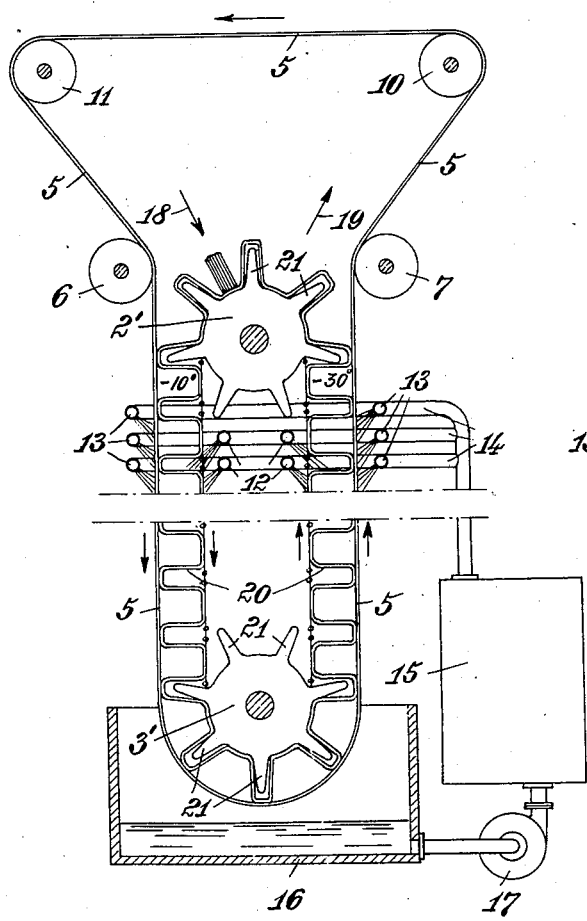
Fig. 2 is a similar view of an apparatus of modified construction.

In Fig. 1 a circulating endless inner band 1 is guided over an upper reversing pulley 2 and a lower reversing pulley 3. The band is about 1 metre in width but may be more or less than this figure according to the purpose of use and it has on its outer side holding devices 4 standing perpendicularly to the surface of the band and consisting of plate-shaped bodies, or of bars arranged for example to form lattice work. These holding devices 4 serve at the same time as spaced elements for a second and outer endless band 5 surrounding the first and bearing against the spacer elements 4 below the reversing pulleys 6 and 7 and which in order to leave the upper end of the band 1 free, is guided over rollers 8 and 9 as shown in Fig. 1 or over rollers 10 and 11 as shown in Fig. 2. Nozzles 12 or the like are directed against the inner surface of the band 1 both on the ascending side and also on the descending side, and these nozzles spray the inner surface of the band with brine supplied from an evaporator. Nozzles 13 spray brine against the outer surface of the ascending and descending sides of the band 5 on the portion surrounding the inner band 1, the nozzles 12 and 13 being connected to an evaporator 15 by pipes 14. The brine trickles down the surfaces of the bands 1 and 5 and is caught at the bottom in a receptacle 16 from which it is returned to the evaporator 15 in circulation by a pump aggregate 17. The direction in which the bands circulate is indicated by arrows. Corresponding to this circulating direction the point for introducing the victuals is situated at 18, the victuals being placed by hand in the holding devices 4 spread at the upper bend of the band, where sufficient space for an operator to introduce the victuals at this point is obtained by the guiding of the band 5. However, devices may also be provided which push the victuals out of a trough, of a table or the like into the transverse spaces between the holders 4. For this purpose any kind of push rods or trough-shaped devices may be employed which for example tip the victuals into the spaces between the holders 4. The victuals to be frozen are then carried along by the holders which after or on leaving the upper reversing pulley 2 tightly clamp the victuals between them, as the holders 4 again move into their parallel position and convey the victuals in circulation up to the delivery point 19, where they are removed either by hand or by corresponding push devices. During the circulating period, which must correspond to the refrigerating period, the victuals are cooled to a low temperature or frozen with brine by the continuous spraying of the bands 1 and 5. To ensure a good cold exchange during the spraying, the holding devices are made of a good heat conducting material with the result that the refrigerating process effects a uniform freezing of the victuals from all sides. When employing push devices for introducing and removing the victuals at the points 18 and 19 respectively, the circulation of the bands 1 and 5 is preferably interrupted during the time necessary for the introduction and removal. To facilitate removal at the point 19, especially when it is to be feared that the victuals will freeze on to the holding devices 4, the reversing roller 2 may be provided with a heating device so that the victuals are easily detached by a slight application of heat. This can have no influence on the victuals themselves especially if they are cooled below freezing point.

The brines used may have different temperatures, so that the cooling becomes lower during the progressive movement of the victuals between the bands. Thus, for example in the descending portion cooling temperatures are employed commencing with about −10° C. at point 18 and ending with about −30° C. near the delivering point 19.

According to the invention the victuals may be guided only in a descending portion of the bands (left half of Fig. 1), so that they are introduced at 18 and removed at the bottom. In this instance the band 5 may be omitted entirely and a stationary wall sprayed with brine be used in its stead.

According to Fig. 2 a corrugated elastic band 20 is used instead of the inner smooth band 1 with its holders 4, and this band 20 is for example of a stainless steel band. The reversing pulleys 2' and 3' may in this instance be provided with teeth or profiles 21 corresponding to the corrugations and engaging them to drive the band. To prevent the band from stretching, the inner peaks of the corrugations may be connected by chains, straps, links or the like. In this instance the corrugations spread at the top and bottom to enable the victuals to be easily introduced and removed. The great advantage of this construction is, that the victuals are accommodate in the indentations of the corrugations so that they are surrounded on all sides by walls directly sprayed with brine, so that the freezing process takes place from all sides in a very uniform manner and the circulating period can be shortened.

Figure 3:
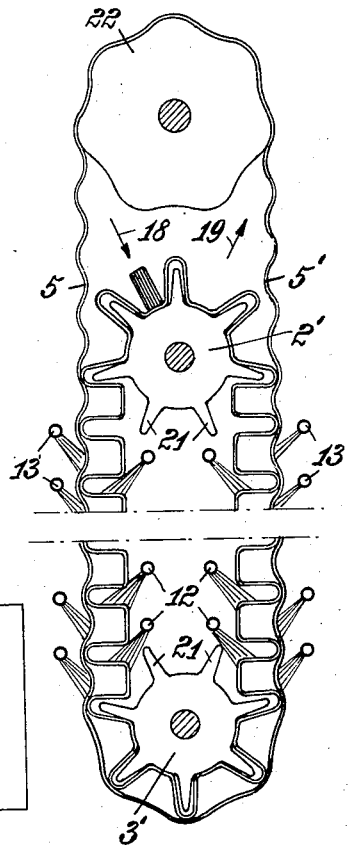
Fig. 3 shows an end view of another arrangement of endless bands.

To cause the victuals to bear against the bands in a direction perpendicularly to the bands 20 and 5, the surrounding band 5' may have corrugations as shown in Fig. 3. The peaks of these corrugations engage in the indentations of band 20 and resiliently press against the victuals. The reversal of the surrounding band 5 is here effected by a single upper reversing pulley 22.

In the forms of the invention shown in Figures 4 and 5 there is disclosed an endless band or belt trained around vertically spaced pulleys 2 and 3 and provided with holders or carriers 4 just as in the form of the invention shown in Figure 1. Also at the bottom of the device there is provided a receptacle 16. The belt 5 in the form shown in Fig. 4 is replaced by a thin stationary wall 5a of suitable heat transmitting material and this wall extends parallel to the vertical runs of the belt 1 and has its lower part curved outwardly as at 5c. The receptacle 16 is provided in one wall with a delivery opening 19a and the curved end 5c leads to the top of this opening. Extending inwardly of the receptacle from the lower edge of the opening 19a is a platform 19b. This form of the invention is likewise provided with brine pipes 14 having spray nozzles 12 for delivering cold brine to the inner face of the belt 1. Also the brine pipes are provided with spray nozzles 13a delivering cold brine against the outer face of the wall 5a. In the operation of this form of the invention the pulleys rotate shown by the arrows thereon. The material to be chilled is fed in at 18 and passes down along side of the wall 5a, being chilled during its passage by the action of the brine from the nozzles 12 and 13. Upon reaching the pulley 3 the material slides off of the holders 4 onto the platform 19b from which it may be removed through the opening 19a.

In the form of the invention shown in Fig. 5 there is provided a wall 5b which extends down under the pulley 3 and which has vertically extending portions spaced from each vertical run of the belt 1. In this form of the invention the brine pipes 14 are provided with nozzles 12 spraying cold brine on both vertical runs of the belt 1. Also the pipes 14 are provided with nozzles 13c spraying cold brine on the outer side of each vertical stretch of the wall 5b. In the operation of this form of the device the material is delivered at 18 as before but this material passes down one side and up the other side for delivery at the point 19b.

I claim:

1. A refrigerating apparatus comprising an inner and an outer band, means for guiding said bands in travel in spaced parallel vertical paths, with the inner band wholly within the path of travel of the outer band, said inner band being provided with article supporting means projecting toward the outer band, and means for directing a refrigerating agent into contact with the respective bands at the adjacent vertical portions of said bands and on the faces of the bands exterior to the space between the bands.

2. A construction as defined in claim 1, wherein adjacent portions of the respective bands move in the same direction and wherein the normal spaced relation of the bands is materially increased at a definite point to permit loading and unloading of the article supporting means of the inner band without interference with the outer band.

3. A construction as defined in claim 1, wherein the refrigerating agent is delivered against each band at an upper part of such band and permitted to flow lengthwise such band to the extreme lower part of the band.

4. A construction as defined in claim 1, wherein the article supporting means is integral with the inner band.

5. A construction as defined in claim 1, wherein the article supporting means are hollow and open to the refrigerating agent.

6. A construction as defined in claim 1, wherein the article supporting means are of hollow form integral with the inner band and open to the refrigerating agent.

7. A construction as defined in claim 1, wherein the article supporting means are of hollow form integral with the inner band and open to the refrigerating agent and the outer band is corrugated, with the corrugations interfitting with the article supporting means of the inner band.

8. A refrigerating apparatus including a band and a thermo-conductive wall, with the band movable and defining with the wall a spaced vertical passage, article supporting elements carried by the band and substantially bridging the space between the band and wall, and means for directing a refrigerating agent into direct contact with the outer surface only of the wall and into direct contact with the inner surface only of the band.

JOHANNES REEH.